United States Patent
Tanaka (10) Patent No.: US 7,522,939 B2
(45) Date of Patent: Apr. 21, 2009

(54) RADIO COMMUNICATION APPARATUS

(75) Inventor: Toyohisa Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 339 days.

(21) Appl. No.: 10/581,719

(22) PCT Filed: Dec. 16, 2003

(86) PCT No.: PCT/JP03/16125

§ 371 (c)(1),
(2), (4) Date: Jun. 5, 2006

(87) PCT Pub. No.: WO2005/060125

PCT Pub. Date: Jun. 30, 2005

(65) Prior Publication Data

US 2007/0111759 A1  May 17, 2007

(51) Int. Cl.
*H04M 1/00* (2006.01)
(52) U.S. Cl. .................. 455/562.1; 455/272; 455/273; 455/276.1; 455/561; 342/81; 342/155; 342/354
(58) Field of Classification Search ............... 455/561, 455/562.1, 272, 273, 276.1; 342/81, 155, 342/354
See application file for complete search history.

(56) References Cited

U.S. PATENT DOCUMENTS

| | | | | |
|---|---|---|---|---|
| 5,218,359 | A * | 6/1993 | Minamisono | 342/383 |
| 5,585,803 | A * | 12/1996 | Miura et al. | 342/372 |
| 6,414,631 | B1 * | 7/2002 | Fujimoto | 342/379 |
| 6,771,988 | B2 * | 8/2004 | Matsuoka et al. | 455/562.1 |
| 7,263,385 | B2 * | 8/2007 | Gurelli et al. | 455/562.1 |
| 7,274,951 | B2 * | 9/2007 | Maruta | 455/562.1 |
| 2003/0228887 | A1 * | 12/2003 | Kishigami et al. | 455/561 |
| 2005/0033165 | A1 * | 2/2005 | Ustuner et al. | 600/437 |
| 2005/0101352 | A1 * | 5/2005 | Logothetis et al. | 455/562.1 |

FOREIGN PATENT DOCUMENTS

| | | |
|---|---|---|
| JP | 08-316896 | 11/1996 |
| JP | 09-162638 | 6/1997 |
| JP | 11-234035 | 8/1999 |
| JP | 2001-267844 | 9/2001 |
| JP | 2002-065670 | 3/2002 |
| JP | 2002-135032 | 5/2002 |

* cited by examiner

*Primary Examiner*—Lester Kincaid
*Assistant Examiner*—Isaak R Jama
(74) *Attorney, Agent, or Firm*—Oblon, Spivak, McClelland, Maier & Neustadt, P.C.

(57) ABSTRACT

A radio communication apparatus includes a received beam generating section 12 for generating received beams beam0 and beam1, which are perpendicular to each other and spatially separated, by assigning weights to received signals fed from receiving antennas 11 by using received beam weights; path search sections 13 and 14 each for outputting path information when the received beams beam0 or beam1 includes a spread signal spread by a known spreading code; a demodulating section 16 for outputting demodulation data by receiving the received beams beam0 and beam1 and by RAKE combining them in response to the path information; and a feedback control section 15 for outputting selection information 101 by selecting a transmission beam to be transmitted in response to the path information and the phase difference between the received beams beam0 and beam1 fed from the demodulating section 16.

3 Claims, 7 Drawing Sheets

| Received beams | Transmission beam to be selected | Selecting conditions |
|---|---|---|
| beam0 | beam0 | No conditions |
| beam1 | beam1 | No conditions |
| beam0 and beam1 | beam2 | When receiving paths with same delay in received beams beam0 and beam1 have opposite phases |
| | beam3 | When receiving paths with same delay in received beams beam0 and beam1 have same phase |

RADIO COMMUNICATION APPARATUS

TECHNICAL FIELD

The present invention relates to a radio communication apparatus for carrying out communication with mobile radio terminals.

BACKGROUND ART

As shown in Japanese patent application laid-open No. 8-316896/1996, for example, to cover the nondirectional 360° range in a horizontal direction with four receiving antennas, a conventional radio communication apparatus carries out its receiving processing by generating four signals by combining outputs of the four receiving antennas to improve receiving characteristics. Another conventional radio communication apparatus has a configuration that performs its receiving processing independently for individual receiving antennas, and combines the results.

With the foregoing configurations, the conventional radio communication apparatuses must have the demodulating sections of the same number as the receiving antennas to perform the demodulation processing each. This offers a problem of increasing the size of the radio communication apparatus.

The present invention is implemented to solve the foregoing problems. Therefore it is an object of the present invention to provide a radio communication apparatus capable of reducing the number of the demodulating sections as compared with the number of the receiving antennas, thereby being able to reduce the size of the apparatus.

DISCLOSURE OF THE INVENTION

According to an aspect of the present invention, there is provided a radio communication apparatus that has first, second, third and fourth receiving antennas for receiving incoming radio waves, and carries out communication with mobile communication terminals, the radio communication apparatus including: a received beam generating section for generating first and second received beams which are perpendicular to each other and spatially separated by assigning weights to received signals fed from the first, second, third and fourth receiving antennas by using first and second received beam weights utilizing Fourier transform; a first path search section for measuring correlation between the first received beam fed from the received beam generating section and a known spreading code set for each of the individual mobile communication terminals, and for outputting path information when the first received beam includes a signal spread by the spreading code; a second path search section for measuring correlation between the second received beam fed from the received beam generating section and a known spreading code set for each of the individual mobile communication terminals, and for outputting path information when the second received beam includes a signal spread by the spreading code; and a demodulating section for receiving the first and second received beams from the received beam generating section, and for outputting demodulation data by performing RAKE combining in response to the path information fed from the first and second path search sections.

According to the present invention, the single demodulating section is enough for the demodulation processing for the four receiving antennas, which offers an advantage of being able to reduce the size of the apparatus.

BEST MODE FOR CARRYING OUT THE INVENTION

The best mode for carrying out the invention will now be described with reference to the accompanying drawings to explain the present invention in more detail.

Embodiment 1

Figure 1:
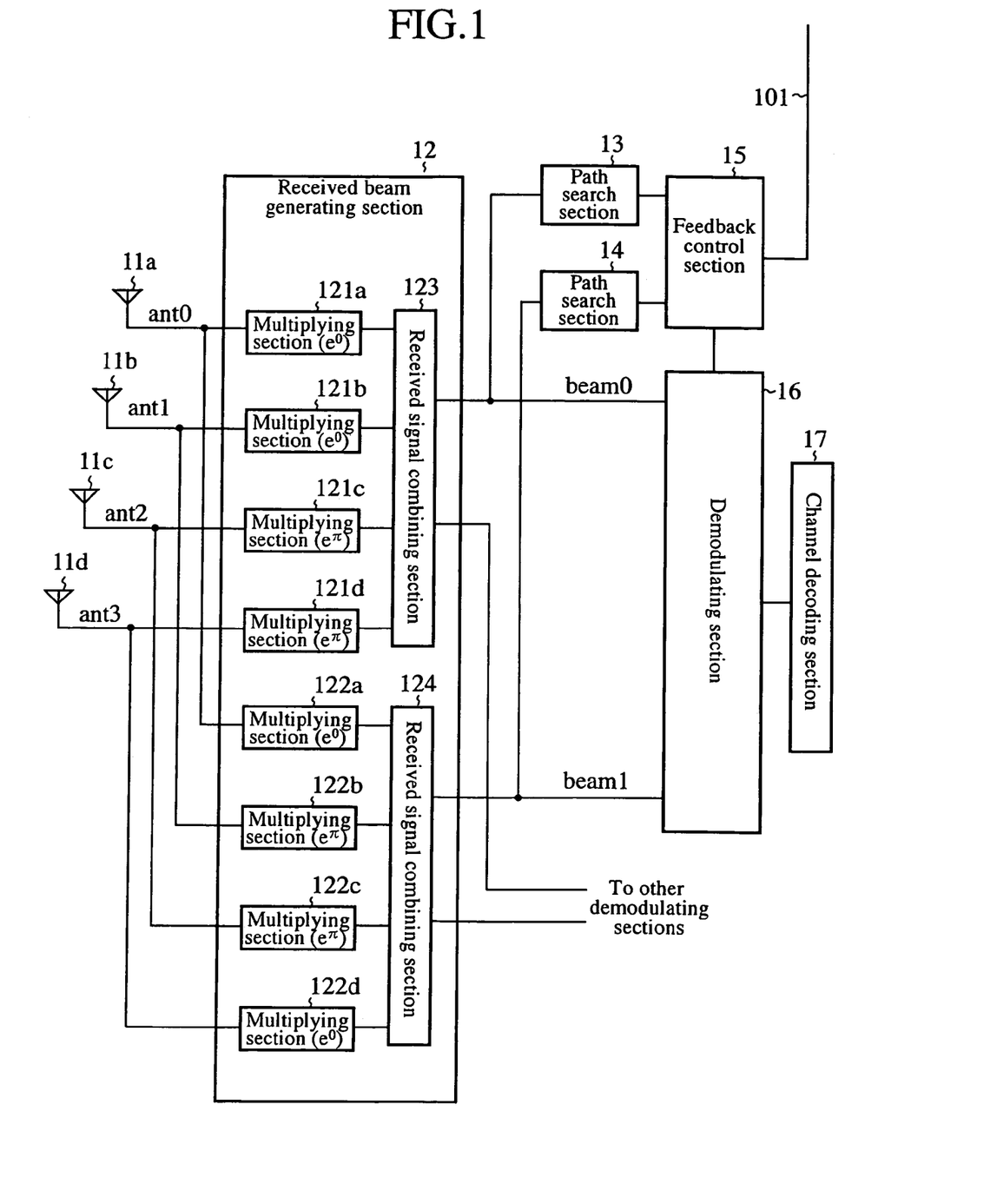
FIG. 1 is a block diagram showing a configuration of a receiving apparatus in a radio communication apparatus of an embodiment 1 in accordance with the present invention.

FIG. 1 is a block diagram showing a configuration of a receiving apparatus in a radio communication apparatus of an embodiment 1 in accordance with the present invention.

Figure 2:
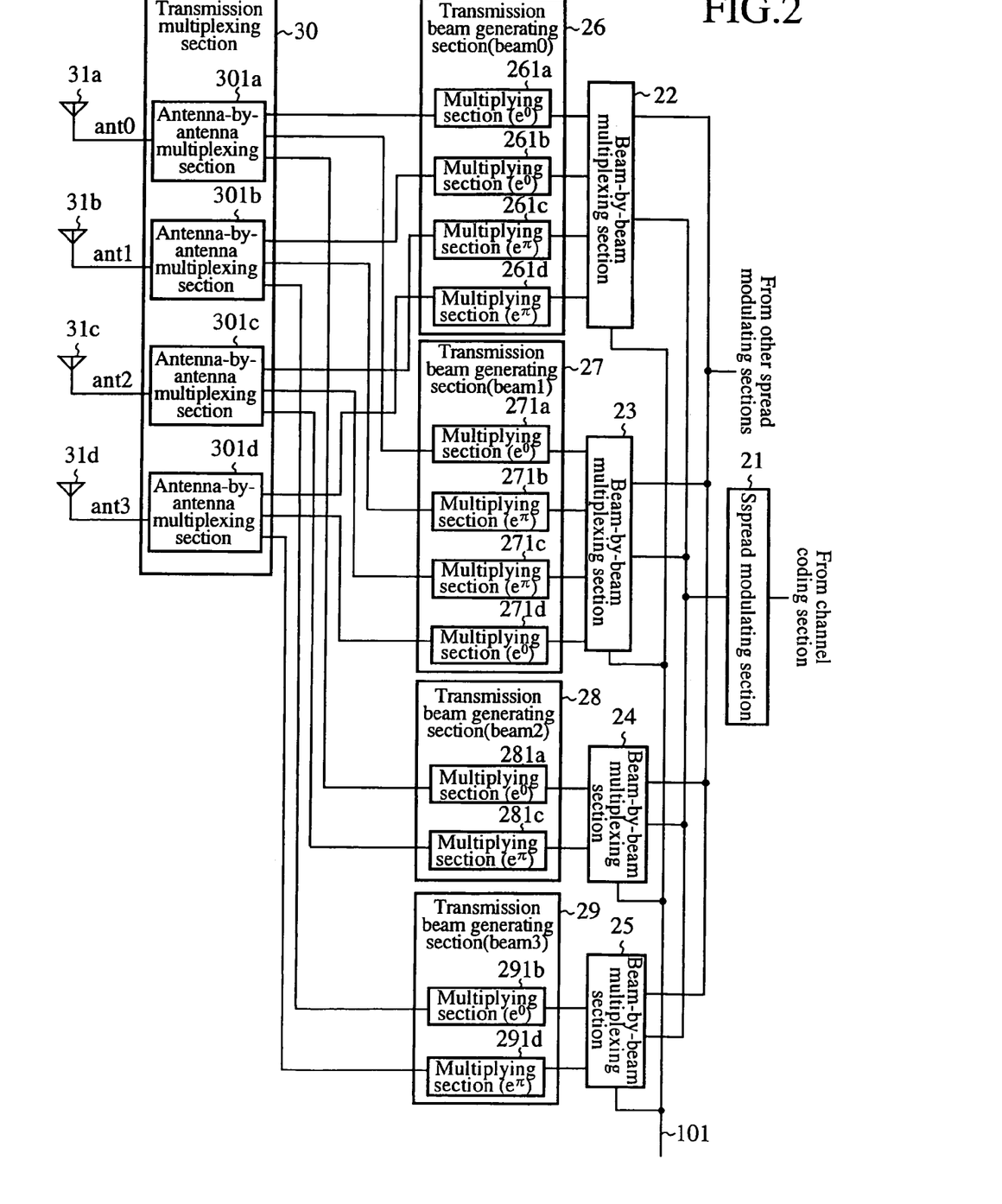
FIG. 2 is a block diagram showing a configuration of a transmitting apparatus in the radio communication apparatus of the embodiment 1 in accordance with the present invention.

The radio communication apparatus, which comprises the receiving apparatus as shown in FIG. 1 and the transmitting apparatus as shown in FIG. 2, and carry out communication by receiving signals transmitted from mobile communication terminals in the surrounding 360° range in the horizontal direction, is used for W-CDMA (Wideband Code Division Multiple Access) communication system, for example.

As shown in FIG. 1, the receiving apparatus of the radio communication apparatus includes four receiving antennas 11a, 11b, 11c and 11d (ant0, ant1, ant2 and ant3); a received beam generating section 12; path search sections 13 and 14; a feedback control section 15; a demodulating section 16; and a channel decoding section 17.

In FIG. 1, the receiving antennas 11a, 11b, 11c and 11d receive incoming radio waves, and output received signals. The received beam generating section 12 assigns weights to the four received signals fed from the receiving antennas 11a, 11b, 11c and 11d by using received beam weights $W_{RXbeam0}$ and $W_{RXbeam1}$ using Fourier transform, thereby generating two received beams beam0 and beam1 which are perpendicular to each other and spatially separated.

The path search section 13, using the received beam beam0 from the received beam generating section 12 and a known spreading code that is set for each mobile communication terminal, measures correlation, and outputs path information when the received beam beam0 includes the signal spread by a desired known spreading code. Likewise, the path search section 14, using the received beam beam1 from the received beam generating section 12 and the known spreading code that is set for each mobile communication terminal, measures correlation, and outputs path information when the received beam beam1 includes the signal spread by the desired known spreading code.

The feedback control section 15 selects a transmission beam to be transmitted according to the path information from the path search sections 13 and 14 and the phase difference between the received beam beam0 and received beam beam1 delivered from the demodulating section 16, and outputs selection information 101.

The demodulating section 16 accepts the received beams beam0 and beam1 fed from the received beam generating section 12, RAKE combines them according to the path information delivered from the feedback control section 15, and outputs demodulation data. In addition, the demodulating section 16 notifies the feedback control section 15 of the phase difference between the received beam beam0 and received beam beam1.

The channel decoding section 17 receives the demodulation data from the demodulating section 16, and carries out deinterleaving, rate dematching, error correction and the like.

The received beam generating section 12 includes multiplying sections 121a, 121b, 121c and 121d for assigning weights to the received signals from the receiving antennas 11a, 11b, 11c and 11d by multiplying them by weighting constants $e^0$, $e^0$, $e^\pi$ and $e^\pi$, respectively; multiplying sections 122a, 122b, 122c and 122d for assigning weights to the received signals from the receiving antennas 11a, 11b, 11c and 11d by multiplying them by weighting constants $e^0$, $e^\pi$, $e^{90}$ and $e^0$, respectively; a received signal combining section 123 for generating the received beam beam0 by combining the received signals weighted by the multiplying sections 121a, 121b, 121c and 121d; and a received signal combining section 124 for generating the received beam beam1 by combining the received signals weighted by the multiplying sections 122a, 122b, 122c and 122d.

As shown in FIG. 2, the transmitting apparatus of the radio communication apparatus includes a spread modulating section 21, beam-by-beam multiplexing sections 22, 23, 24 and 25, transmission beam generating sections 26, 27, 28 and 29, a transmission multiplexing section 30, and four transmitting antennas 31a, 31b, 31c and 31d (ant0, ant1, ant2 and ant3).

In FIG. 2, the spread modulating section 21 receives user data to be transmitted to the individual mobile communication terminals, performs spreading processing using the spreading code set for each of the individual mobile communication terminals, and outputs spread data of the user.

The beam-by-beam multiplexing sections 22 and 23 receive the spread data of a plurality of users from a plurality of spread modulating sections 21, multiplex the spread data of the plurality of users in response to the selection information 101 from the feedback control section 15 on a transmission beam-by-transmission beam basis, and output the spread data of the plurality of users passing through the multiplexing in correspondence with the individual transmitting antennas 31a, 31b, 31c and 31d.

Likewise, the beam-by-beam multiplexing section 24 receives the spread data of the plurality of users from the plurality of spread modulating sections 21, multiplexes the spread data of the plurality of users in response to the selection information 101 on a transmission beam-by-transmission beam basis, and outputs the spread data of the plurality of users passing through the multiplexing in correspondence with the individual transmitting antennas 31a and 31c.

Likewise, the beam-by-beam multiplexing section 25 receives the spread data of the plurality of users from the plurality of spread modulating sections 21, multiplexes the spread data of the plurality of users in response to the selection information 101 on a transmission beam-by-transmission beam basis, and outputs the spread data of the plurality of users passing through the multiplexing in correspondence with the individual transmitting antennas 31b and 31d.

The transmission beam generating sections 26 and 27 receive the spread data of the plurality of users passing through the multiplexing, which are output from the beam-by-beam multiplexing sections 22 and 23 in correspondence with the individual transmitting antennas 31a, 31b, 31c and 31d, assign weights to them by transmission beam weights $W_{TXbeam0}$ and $W_{TXbeam1}$, and output the weighted spread data of the plurality of users passing through the multiplexing in correspondence with the individual transmitting antennas 31a, 31b, 31c and 31d.

Likewise, the transmission beam generating section 28 receives the spread data of the plurality of users passing through the multiplexing, which are output from the beam-by-beam multiplexing section 24 in correspondence with the individual transmitting antennas 31a and 31c, assigns weights to them by a transmission beam weight $W_{TXbeam2}$, and outputs the weighted spread data of the plurality of users passing through the multiplexing in correspondence with the individual transmitting antennas 31a and 31c.

Likewise, the transmission beam generating section 29 receives the spread data of the plurality of users passing through the multiplexing, which are output from the beam-by-beam multiplexing section 25 in correspondence with the individual transmitting antennas 31b and 31d, assigns weights to them by a transmission beam weight $W_{TXbeam3}$, and outputs the weighted spread data of the plurality of users passing through the multiplexing in correspondence with the individual transmitting antennas 31b and 31d.

The transmission multiplexing section 30 receives the weighted spread data of the plurality of users passing through the multiplexing, which are output from the transmission beam generating sections 26, 27, 28 and 29 in correspondence with the individual transmitting antennas 31a, 31b, 31c and 31d, multiplexes them on an antenna-by-antenna basis of the transmitting antennas 31a, 31b, 31c and 31d, and supplies them to the individual transmitting antennas 31a, 31b, 31c and 31d.

Here, the transmission beam generating section 26 includes multiplying sections 261a, 261b, 261c and 261d for receiving the spread data of the plurality of users passing through the multiplexing output from the beam-by-beam multiplexing section 22 in correspondence with the transmitting antennas 31a, 31b, 31c and 31d, for assigning weights to them by multiplying the weighting constants $e^0$, $e^0$, $e^\pi$ and $e^\pi$, and for outputting the weighted spread data of the plurality of users passing through the multiplexing in correspondence with the transmitting antennas 31a, 31b, 31c and 31d.

Likewise, the transmission beam generating section 27 includes multiplying sections 271a, 271b, 271c and 271d for receiving the spread data of the plurality of users passing through the multiplexing output from the beam-by-beam multiplexing section 23 in correspondence with the transmitting antennas 31a, 31b, 31c and 31d, for assigning weights to them by multiplying the weighting constants $e^0$, $e^\pi$, $e^\pi$ and $e^0$, and for outputting the weighted spread data of the plurality of users passing through the multiplexing in correspondence with the transmitting antennas 31a, 31b, 31c and 31d.

Likewise, the transmission beam generating section 28 includes multiplying sections 281a and 281c for receiving the spread data of the plurality of users passing through the multiplexing output from the beam-by-beam multiplexing section 24 in correspondence with the transmitting antennas 31a and 31c, for assigning weights to them by multiplying the weighting constants $2e^0$ and $2e^\pi$, and for outputting the weighted spread data of the plurality of users passing through the multiplexing in correspondence with the transmitting antennas 31a and 31c.

Likewise, the transmission beam generating section 29 includes multiplying sections 291b and 291d for receiving the spread data of the plurality of users passing through the multiplexing output from the beam-by-beam multiplexing section 25 in correspondence with the transmitting antennas 31b and 31d, for assigning weights to them by multiplying the weighting constants $2e^0$ and $2e^{90}$, and for outputting the weighted spread data of the plurality of users passing through the multiplexing in correspondence with the transmitting antennas 31b and 31d.

The transmission multiplexing section 30 includes an antenna-by-antenna multiplexing section 301a for receiving the weighted spread data of the plurality of users passing through the multiplexing output from the transmission beam generating sections 26, 27 and 28 in correspondence with the transmitting antenna 31a, for multiplexing them for the transmitting antenna 31a, and for supplying them to the transmitting antenna 31a; an antenna-by-antenna multiplexing section 301b for receiving the weighted spread data of the plurality of users passing through the multiplexing output from the transmission beam generating sections 26, 27 and 29 in correspondence with the transmitting antenna 31b, for multiplexing them for the transmitting antenna 31b, and for supplying them to the transmitting antenna 31b; an antenna-by-antenna multiplexing section 301c for receiving the weighted spread data of the plurality of users passing through the multiplexing output from the transmission beam generating sections 26, 27 and 28 in correspondence with the transmitting antenna 31c, for multiplexing them for the transmitting antenna 31c, and for supplying them to the transmitting antenna 31c; and an antenna-by-antenna multiplexing section 301d for receiving the weighted spread data of the plurality of users passing through the multiplexing output from the transmission beam generating sections 26, 27 and 29 in correspondence with the transmitting antenna 31d, for multiplexing them for the transmitting antenna 31d, and for supplying them to the transmitting antenna 31d.

Figure 3:
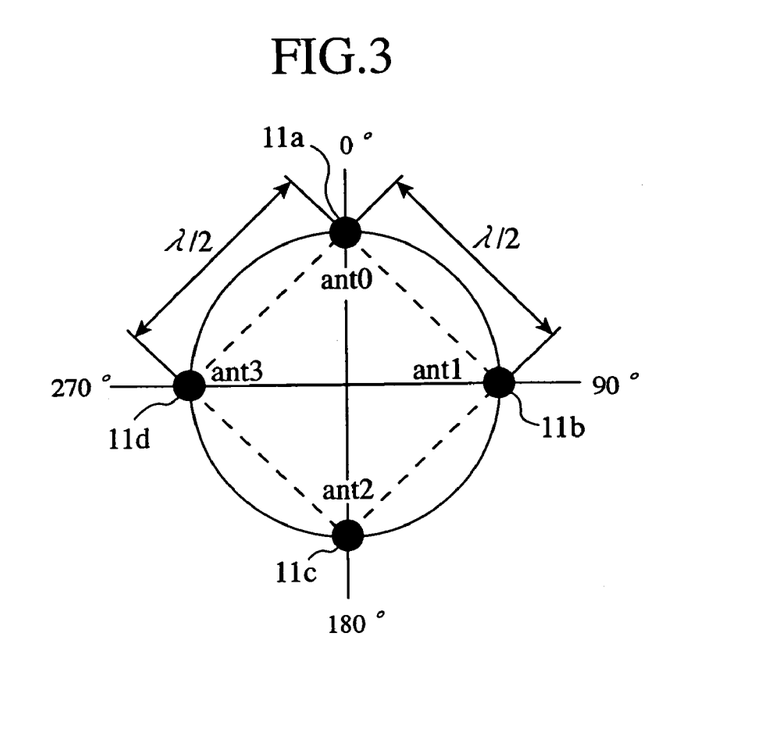
FIG. 3 is a diagram showing a disposition of receiving antennas in the radio communication apparatus of the embodiment 1 in accordance with the present invention.

FIG. 3 is a diagram showing a disposition of the receiving antennas. The individual receiving antennas 11a, 11b, 11c and 11d (ant0, ant1, ant2 and ant3) are placed in the directions 0°, 90°, 180° and 270° at every $\lambda/2$ interval ($\lambda$ is the wavelength of the received radio wave).

Figure 4:
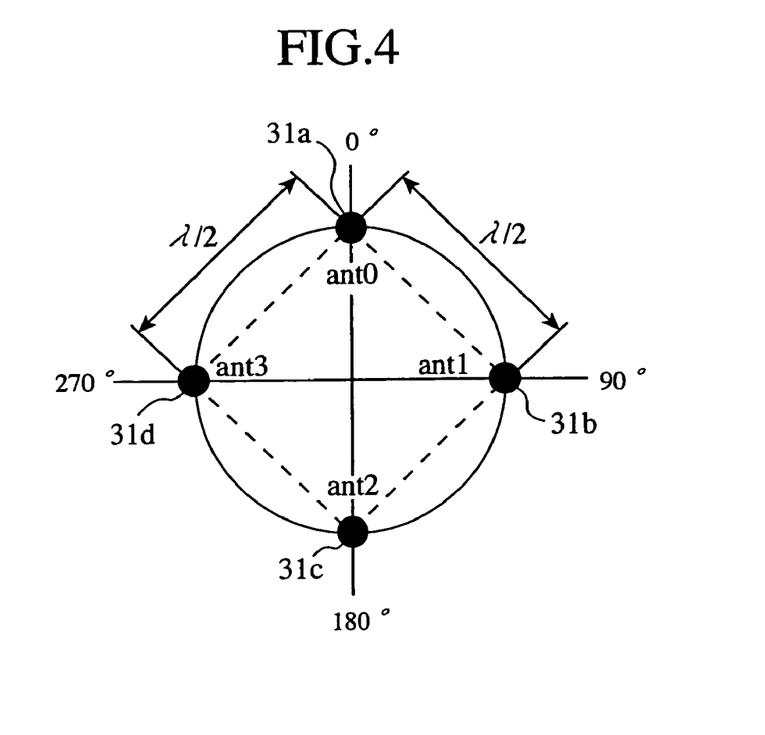
FIG. 4 is a diagram showing a disposition of transmitting antennas in the radio communication apparatus of the embodiment 1 in accordance with the present invention.

FIG. 4 is a diagram showing a disposition of the transmitting antennas. The individual transmitting antennas 31a, 31b, 31c and 31d (ant0, ant1, ant2 and ant3) are placed in the directions 0°, 90°, 180° and 270° at every $\lambda/2$ interval ($\lambda$ is the wavelength of the transmitting radio wave) just as the individual receiving antennas 11a, 11b, 11c and 11d.

Next, the operation of the receiving apparatus as shown in FIG. 1 will be described.

The four receiving antennas 11a, 11b, 11c and 11d (ant0, ant1, ant2 and ant3) receive the incoming radio waves, and supply four received signals $x_0(t)$, $x_1(t)$, $x_2(t)$ and $x_3(t)$ to the received beam generating section 12.

The received beam generating section 12 assigns weights to the four received signals $x_0(t)$, $x_1(t)$, $x_2(t)$ and $x_3(t)$ fed from the individual receiving antennas 11a, 11b, 11c and 11d by using the received beam weights $W_{RXbeam0}$ and $W_{RXbeam1}$ using Fourier transform, generates the two received beams beam0 and beam1 which are perpendicular to each other and spatially separated, and outputs them. The received beam weights $W_{RXbeam0}$ and $W_{RXbeam1}$ are used to generate the received beams beam0 and beam1 which are perpendicular to each other and spatially separated.

In the received beam generating section 12, the multiplying sections 121a assigns the weight by multiplying the received signal $x_0(t)$ fed from the receiving antenna 11a by the weighting constant $e^0$; the multiplying sections 121b assigns the weight by multiplying the received signal $x_1(t)$ fed from the receiving antenna 11b by the weighting constant $e^0$; the multiplying sections 121c assigns the weight by multiplying the received signal $x_2(t)$ fed from the receiving antenna 11c by the weighting constant $e^\pi$; and the multiplying sections 121d assigns the weight by multiplying the received signal $x_3(t)$ fed from the receiving antenna 11d by the weighting constant $e^\pi$.

Likewise, in the received beam generating section 12, the multiplying sections 122a assigns the weight by multiplying the received signal $x_0(t)$ fed from the receiving antenna 11a by the weighting constant $e^0$; the multiplying sections 122b assigns the weight by multiplying the received signal $x_1(t)$ fed from the receiving antenna 11b by the weighting constant $e^\pi$; the multiplying sections 122c assigns the weight by multiplying the received signal $x_2(t)$ fed from the receiving antenna 11c by the weighting constant $e^\pi$; and the multiplying sections 122d assigns the weight by multiplying the received signal $x_3(t)$ fed from the receiving antenna 11d by the weighting constant $e^0$.

These multiplications can be easily implemented by code converters and adders.

Furthermore, in the received beam generating section 12, the received signal combining section 123 combines the received signals $x_0(t)$, $x_1(t)$, $x_2(t)$ and $x_3(t)$ weighted by the multiplying sections 121a, 121b, 121c and 121d, thereby generating and outputting the received beam beam0. Likewise, the received signal combining section 124 combines the received signals $x_0(t)$, $x_1(t)$, $x_2(t)$ and $x_3(t)$ weighted by the multiplying sections 122a, 122b, 122c and 122d, thereby generating and outputting the received beam beam1.

The first received beam beam0 generated by the received beam generating section 12 has a radiation pattern with the major lobe in a certain direction and a grating lobe in the 180° degrees opposite direction. The second received beam beam1 has a radiation pattern that is orthogonal to the first received beam beam0, and has the major lobe and grating lobe in a similar manner. Utilizing the grating lobes enables the single received beam to cover a 180° range in total, and the two received beams beam0 and beam1 to cover the 360° range in total. Thus, the received beam generating section 12 converts the four received signals $x_0(t)$, $x_1(t)$, $x_2(t)$ and $x_3(t)$ to the two received beams beam0 and beam1.

Figure 5:
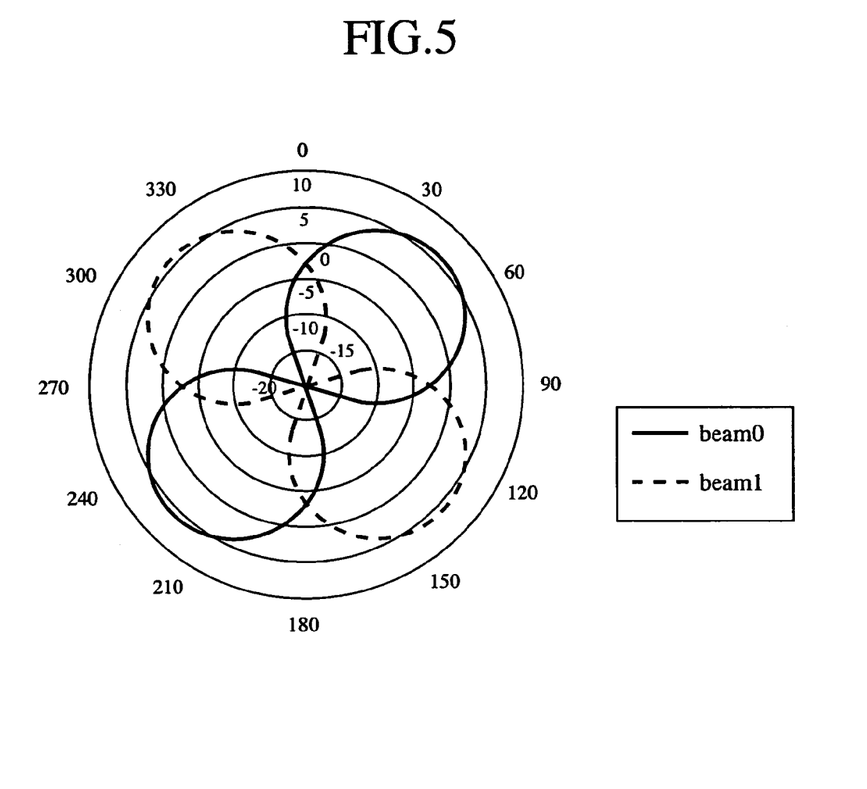
FIG. 5 is a chart showing radiation patterns of received beams beam0 and beam1 generated by a received beam generating section in the radio communication apparatus of the embodiment 1 in accordance with the present invention.

FIG. 5 is a chart showing the radiation patterns of the received beams beam0 and beam1 generated by the received beam generating section 12. When the receiving antennas 11a, 11b, 11c and 11d are disposed as shown in FIG. 3, the received beam beam0 has the radiation pattern with the major lobe and grating lobe in the directions 45° and 225°, and the received beam beam1 has the radiation pattern with the major lobe and grating lobe in the directions 135° and 315°. In this way, the received beam beam0 and received beam1 are perpendicular to each other and separated spatially, and have the radiation patterns with the directivity at every 90° degree interval according to the received beams beam0 and beam1.

In FIG. 5, numerical values "−20 to 10" on concentric circles of the radiation patterns indicate the gains (dB) of the antenna patterns. Here, 0 dB corresponds to the gain of a single receiving antenna, and combining the four receiving antennas 11a, 11b, 11c and 11d without loss quadruples the gain to 6 dB.

As shown in FIG. 5, the radiation patterns of the received beams beam0 and beam1 intersect with each other at 0°, 90°, 180° and 270°, and the gain of each radiation pattern is −2 dB at the intersection points with reference to the gain 0 dB of the single receiving antenna. In other words, at the intersection points, the gain of the received beams beam0 and beam1 output from the received beam generating section 12 reduces by 2 dB from the gain of the single receiving antenna. At the individual intersection points, a single input wave is received with being divided into the two received beams beam0 and beam1.

Next, the beam combining through two-dimensional Fourier transform in the received beam generating section 12 will be described.

The received signal X(t) of the receiving antenna 11 is given by the following expression (1).

$$X(t)=[x_0(t) x_1(t) x_2(t) x_3(t)] \qquad (1)$$

where, $x_0(t)$, $x_1(t)$, $x_2(t)$ and $x_3(t)$ represent the received signals fed from the receiving antennas 11a, 11b, 11c and 11d, respectively, and t represents time.

The received beam weights $W_{RXbeam0}$ and $W_{RXbeam1}$ for generating the received beams beam0 and beam1 are given by the following expressions (2) and (3).

$$W_{RXbeam0}=[e^0 e^0 e^\pi e^\pi]^T \qquad (2)$$

$$W_{RXbeam1}=[e^0 e^\pi e^\pi e^0]^T \qquad (3)$$

where $[*]^T$ represents a transpose, the weighting constant $e^0$ represents a complex number "1+j0"=1, and the weighting constant $e^\pi$ represents a complex number "−1+j0"=−1.

Then, the received beams beam0 and beam1 are given by the following expressions (4) and (5).

$$beam0 = X(t) \cdot W_{RXbeam0} \qquad (4)$$

$$beam1 = X(t) \cdot W_{RXbeam1} \qquad (5)$$

The path search section 13 measures the correlation using the received beam beam0 fed from the received beam generating section 12 and the known spreading code set for each of the individual mobile communication terminals, and outputs, when the received beam beam0 includes the signal spread by the desired known spreading code, the path information including the received power and receiving timing. Likewise, the path search section 14 measures the correlation using the received beam beam1 fed from the received beam generating section 12 and the known spreading code set for each of the individual mobile communication terminals, and outputs, when the received beam beam1 includes the signal spread by the desired known spreading code, the path information including the received power and receiving timing.

The demodulating section 16, receiving the received beams beam0 and beam1 orthogonal to each other from the received beam generating section 12, RAKE combines them in response to the path information given from the path search sections 13 and 14 via the feedback control section 15, and supplies the demodulation data to the channel decoding section 17. At the same time, the demodulating section 16 obtains the phase difference between the received beam beam0 and received beam beam1 by carrying out the channel estimation using a receiving pilot signal, and notifies the feedback control section 15 of the phase difference.

The channel decoding section 17 receives the demodulation data from the demodulating section 16, carries out deinterleaving, rate dematching, error correction and the like, and outputs the user data transmitted from the mobile communication terminal.

The feedback control section 15 selects the transmission beam to be transmitted in response to the path information fed from the path search sections 13 and 14 and the information about the phase difference between received beam beam0 and received beam beam1 given by the demodulating section 16, and outputs the selection information 101.

Figure 6:
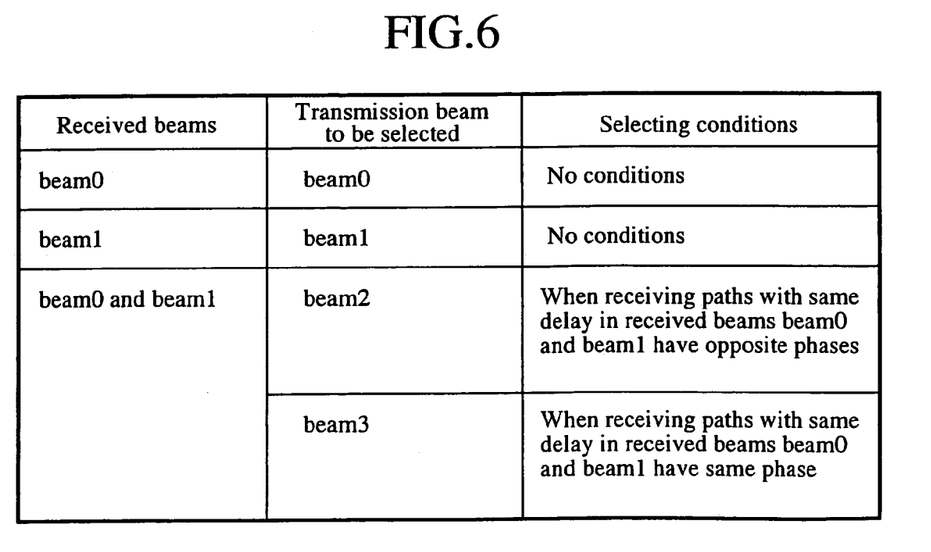
FIG. 6 is a table showing a selecting method of the transmission beams by a feedback control section in the radio communication apparatus of the embodiment 1 in accordance with the present invention.

FIG. 6 is a table showing a selecting method of the transmission beam by the feedback control section 15.

Figure 7:
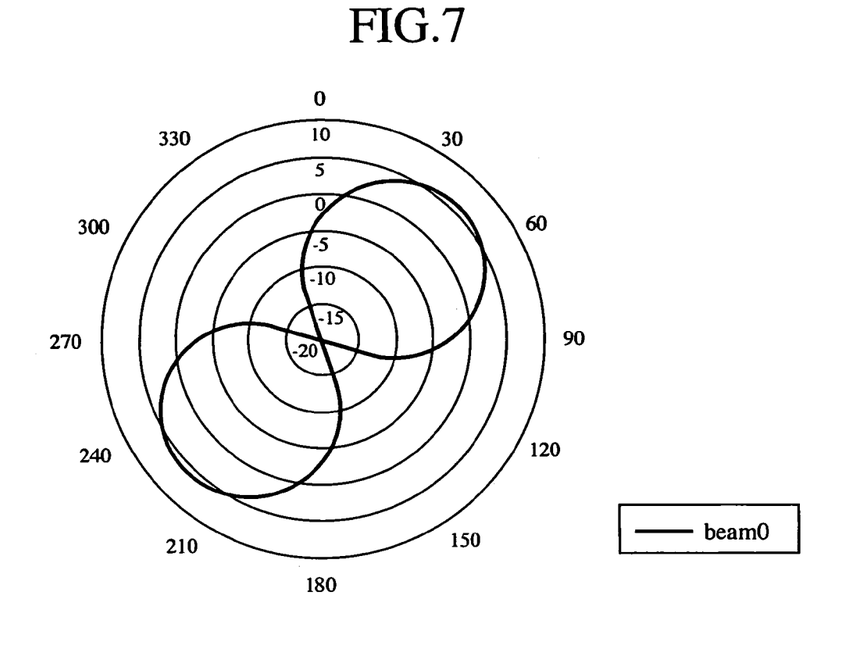
FIG. 7 is a chart showing a radiation pattern of the transmission beam beam0 generated by the transmitting apparatus of the radio communication apparatus of the embodiment 1 in accordance with the present invention.

FIG. 7 is a chart showing a radiation pattern of the transmission beam beam0 radiated from the transmitting apparatus. The radiation pattern has the directivity in the same directions as the received beam beam0, that is, the radiation pattern has the major lobe and grating lobe in the 45° direction and 225° direction.

Figure 8:
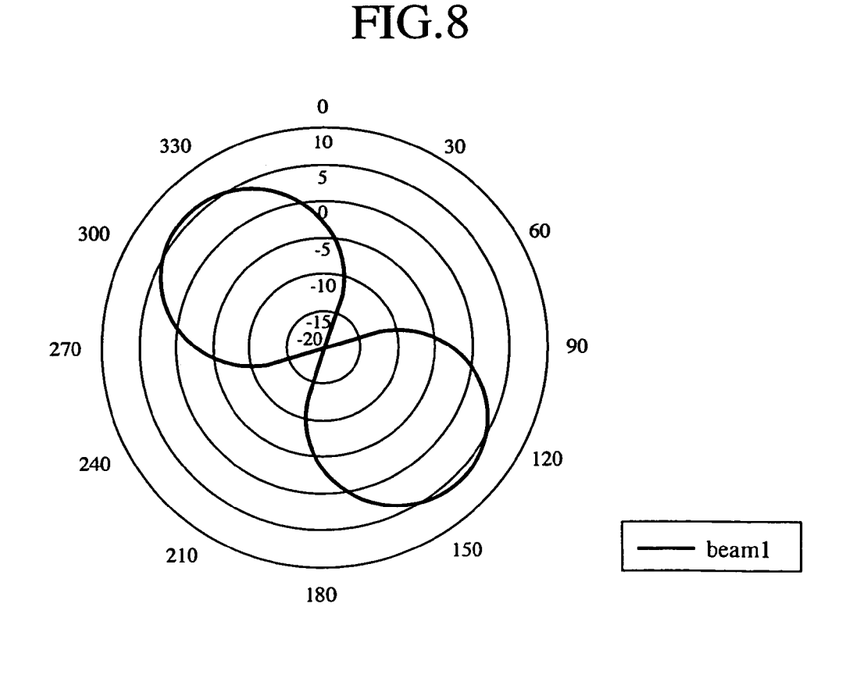
FIG. 8 is a chart showing a radiation pattern of the transmission beam beam1 generated by the transmitting apparatus of the radio communication apparatus of the embodiment 1 in accordance with the present invention.

FIG. 8 is a chart showing a radiation pattern of the transmission beam beam1 radiated from the transmitting apparatus. The radiation pattern has the directivity in the same directions as the received beam beam1, that is, the radiation pattern has the major lobe and grating lobe in the 135° direction and 315° direction.

Figure 9:
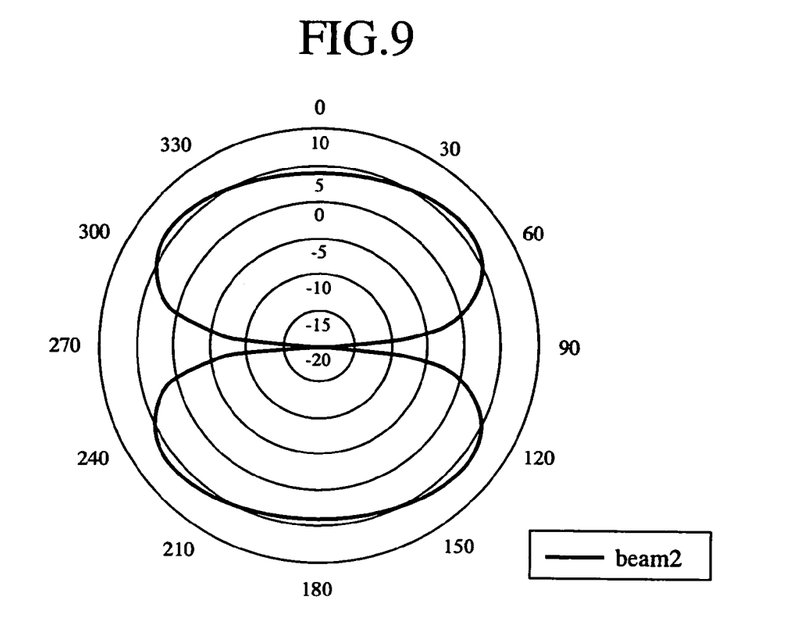
FIG. 9 is a chart showing a radiation pattern of the transmission beam beam2 generated by the transmitting apparatus of the radio communication apparatus of the embodiment 1 in accordance with the present invention.

FIG. 9 is a chart showing a radiation pattern of the transmission beam beam2 radiated from the transmitting apparatus. The radiation pattern has the directivity in the directions of the opposite intersection points of the received beams beam0 and beam1, that is, the radiation pattern has the major lobe and grating lobe in the 0° direction and 180° direction.

Figure 10:
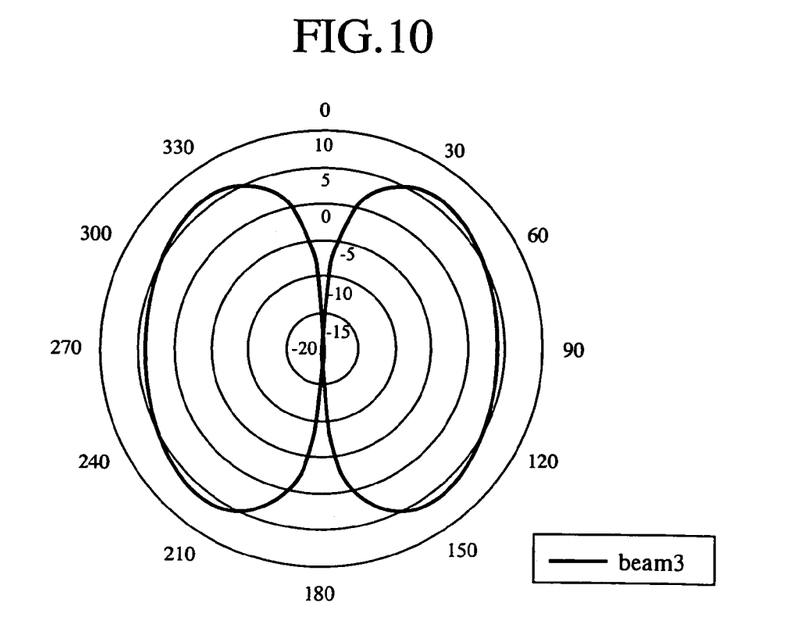
FIG. 10 is a chart showing a radiation pattern of the transmission beam beam3 generated by the transmitting apparatus of the radio communication apparatus of the embodiment 1 in accordance with the present invention.

FIG. 10 is a chart showing a radiation pattern of the transmission beam beam3 radiated from the transmitting apparatus. The radiation pattern has the directivity in the directions 90 degrees shifted from the opposite intersection points of the received beams beam0 and beam1, that is, the radiation pattern has the major lobe and grating lobe in the 90° direction and 270° direction.

Figure 11:
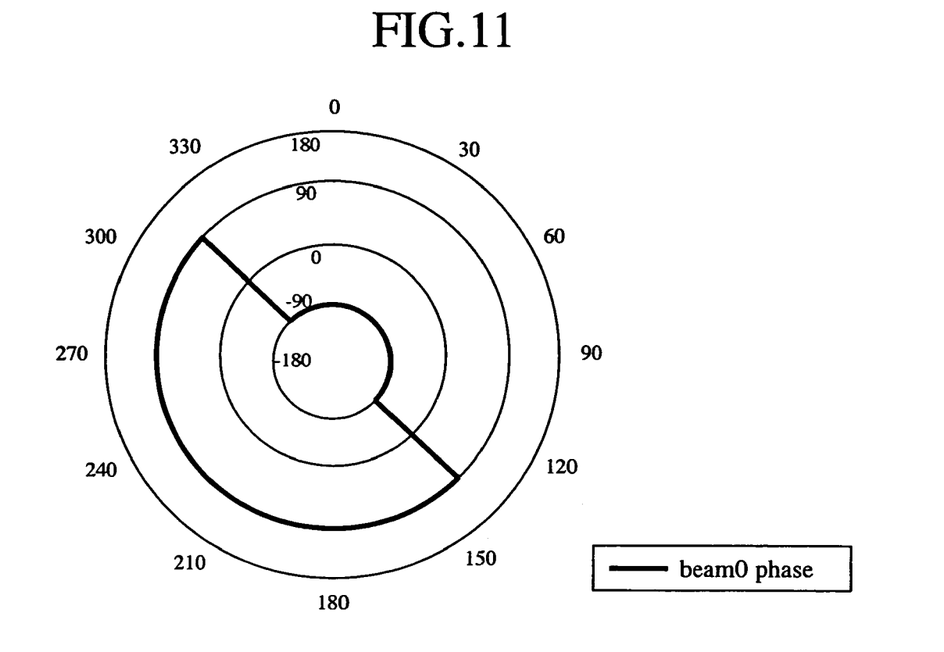
FIG. 11 is a chart showing phase characteristics of the received beam beam0 generated by the received beam generating section of the radio communication apparatus of the embodiment 1 in accordance with the present invention.
Figure 12:
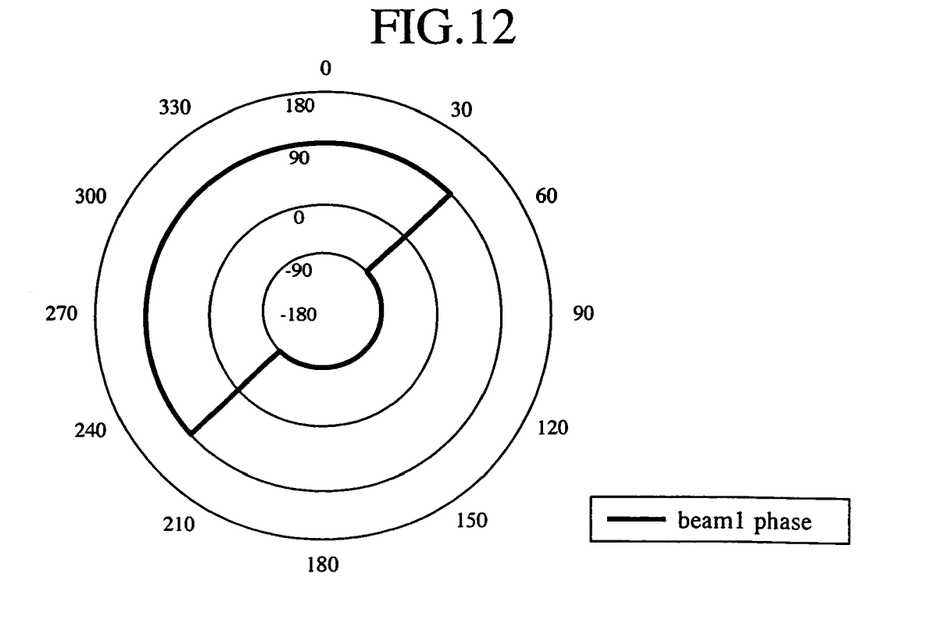
FIG. 12 is a chart showing phase characteristics of the received beam beam1 generated by the received beam generating section of the radio communication apparatus of the embodiment 1 in accordance with the present invention.

FIG. 11 is a chart showing phase characteristics of the received beam beam0 generated by the received beam generating section 12; and FIG. 12 is a chart showing phase characteristics of the received beam beam1 generated by the received beam generating section 12.

As shown in FIG. 6, when the receiving path is found in the received beam beam0 in response to the path information fed from the path search section 13, the feedback control section 15 outputs the selection information 101 enabling the transmission beam beam0 shown in FIG. 7, which has the directivity in the same direction as the received beam beam0. Likewise, when the receiving path is found in the received beam beam1 in response to the path information fed from the path search section 14, the feedback control section 15 outputs the selection information 101 enabling the transmission beam beam1 shown in FIG. 8, which has the directivity in the same direction as the received beam beam1.

Furthermore, as shown in FIG. 6, when the receiving path is found in both the received beam beam0 and received beam beam1 in response to the path information fed from the path search section 13 and path search section 14, the feedback control section 15 selects the transmission beam to be transmitted in response to the information about the phase difference between the received beam beam0 and received beam beam1 given by the demodulating section 16. More specifically, when the receiving paths with the same delay in the received beam beam0 and received beam beam1 have the opposite phase with a phase difference of 180°, the feedback control section 15 outputs the selection information 101 enabling the transmission beam beam2 that has the directivity in the direction of the intersection points of the received beams beam0 and beam1, that is, that has the major lobe and grating lobe in the 0° direction and 180° direction as shown in FIG. 9. On the other hand, when the receiving paths with the same delay in the received beam beam0 and received beam beam1 have the same phase with a phase difference of 0°, the feedback control section 15 outputs the selection information 101 enabling the transmission beam beam3 that has the directivity in the direction of the intersection points of the received beams beam0 and beam1, which is shifted by 90° degrees from the transmission beam beam2, that is, that has the major lobe and grating lobe in the 90° direction and 270° direction as shown in FIG. 10.

As shown in FIG. 5, the radiation patterns of the received beam beam0 and received beam beam1 have the intersection points in the 0°, 90°, 180° and 270° directions. Thus, when the receiving paths are found in both the received beam beam0 and received beam beam1, this means that the incoming waves arrive from the foregoing angles. The phase characteristics of the received beam 0 shown in FIG. 11 and the phase characteristics of the received beam 1 shown in FIG. 12 indicate that their phases are opposite in the 0° and 180° directions with the phase difference of 180°, and that their phases are the same in the 90° and 270° directions with the phase difference of 0°.

Accordingly, when the received beam beam0 and received beam beam1 have the opposite phases with the phase difference of 180°, this means that the incoming waves arrive from the 0° or 180° direction. Thus, the feedback control section 15 outputs the selection information 101 enabling the transmission beam beam2 as shown in FIG. 9. On the other hand, when the received beam beam0 and received beam beam1 have the same phases with the phase difference of 0°, this means that the incoming waves arrive from the 90° or 270° direction. Thus, the feedback control section 15 outputs the selection information 101 enabling the transmission beam beam3 as shown in FIG. 10.

In this way, the feedback control section 15 selects the transmission beam that includes the direction of the incoming waves in which the mobile communication terminal of the user is present. Thus, it is not necessary for the transmitting apparatus to radiate all the transmission beams beam0, beam1, beam2 and beam3 in all the directions of 360°, thereby being able to reduce the transmitting power.

Next, the operation of the transmitting apparatus as shown in FIG. 2 will be described.

The spread modulating section 21 receives user data to be sent to individual mobile communication terminals fed from a channel coding section (not shown), carries out spreading processing using spreading codes that are set for the individual mobile communication terminals, and outputs spread data of the user.

The beam-by-beam multiplexing sections 22 and 23 receive spread data of a plurality of users fed from the spread modulating section 21 and other spread modulating sections (not shown), multiplex the spread data of the plurality of users for each transmission beam in response to the selection information 101 fed from the feedback control section 15 shown in FIG. 1, and output the spread data of the plurality of users passing through the multiplexing in correspondence with the individual transmitting antennas 31a, 31b, 31c and 31d. More specifically, when the selection information 101 fed from the feedback control section 15 is the information that enables the transmission beam beam0, the beam-by-beam multiplexing section 22 multiplexes and outputs the spread data of the user fed from the spread modulating section 21 that enables the transmission beam beam0 and the spread data of the users fed from the other spread modulating sections that enable the transmission beam beam0; and when the selection information 101 fed from the feedback control section 15 is the information that enables the transmission beam beam1, the beam-by-beam multiplexing section 23 multiplexes and outputs the spread data of the user fed from the spread modulating section 21 that enables the transmission beam beam1 and the spread data of the users fed from the other spread modulating sections that enable the transmission beam beam1.

Likewise, the beam-by-beam multiplexing section 24 receives spread data of a plurality of users fed from a plurality of spread modulating sections 21, multiplexes the spread data of the plurality of users for each transmission beam in response to the selection information 101, and outputs the spread data of the plurality of users passing through the multiplexing in correspondence with the individual transmitting antennas 31a and 31c. More specifically, when the selection information 101 fed from the feedback control section 15 is the information that enables the transmission beam beam2, the beam-by-beam multiplexing section 24 multiplexes and outputs the spread data of the user fed from the spread modulating section 21 that enables the transmission beam beam2 and the spread data of the users fed from the other spread modulating sections that enable the transmission beam beam2.

Likewise, the beam-by-beam multiplexing section 25 receives spread data of a plurality of users fed from a plurality of spread modulating sections 21, multiplexes the spread data of the plurality of users for each transmission beam in response to the selection information 101, and outputs the spread data of the plurality of users passing through the multiplexing in correspondence with the individual transmitting antennas 31b and 31d. More specifically, when the selection information 101 fed from the feedback control section 15 is the information that enables the transmission beam beam3, the beam-by-beam multiplexing section 25 multiplexes and outputs the spread data of the user fed from the spread modulating section 21 that enables the transmission beam beam3 and the spread data of the users fed from the other spread modulating sections that enable the transmission beam beam3.

The transmission beam generating section 26 receives the spread data of the plurality of users passing through the multiplexing output from the beam-by-beam multiplexing section 22 in correspondence with the individual transmitting antennas 31a, 31b, 31c and 31d, assigns weights using the transmission beam weight $W_{TXbeam0}$, and outputs the weighted spread data of the plurality of users passing through the multiplexing in correspondence with the individual transmitting antennas 31a, 31b, 31c and 31d.

Likewise, the transmission beam generating section 27 receives the spread data of the plurality of users passing through the multiplexing output from the beam-by-beam multiplexing section 23 in correspondence with the individual transmitting antennas 31a, 31b, 31c and 31d, assigns weights using the transmission beam weight $W_{TXbeam1}$, and outputs the weighted spread data of the plurality of users passing through the multiplexing in correspondence with the individual transmitting antennas 31a, 31b, 31c and 31d.

Likewise, the transmission beam generating section 28 receives the spread data of the plurality of users passing through the multiplexing output from the beam-by-beam multiplexing section 24 in correspondence with the individual transmitting antennas 31a and 31c, assigns weights using the transmission beam weight $W_{TXbeam2}$, and outputs the weighted spread data of the plurality of users passing through the multiplexing in correspondence with the individual transmitting antennas 31a and 31c.

Likewise, the transmission beam generating section 29 receives the spread data of the plurality of users passing through the multiplexing output from the beam-by-beam multiplexing section 25 in correspondence with the individual transmitting antennas 31b and 31d, assigns weights using the transmission beam weight $W_{TXbeam3}$, and outputs the weighted spread data of the plurality of users passing through the multiplexing in correspondence with the individual transmitting antennas 31b and 31d.

The transmission beam weights $W_{TXbeam0}$, $W_{TXbeam1}$, $W_{TXbeam2}$ and $W_{TXbeam3}$ are used for generating the transmission beams beam0, beam1, beam2 and beam3 with the directivities in the directions as shown in FIG. 7, FIG. 8, FIG. 9 and FIG. 10.

The individual transmission beam weights $W_{TXbeam0}$, $W_{TXbeam1}$, $W_{TXbeam2}$ and $W_{TXbeam3}$ are expressed by the following expressions (6), (7), (8) and (9).

$$W_{TXbeam0} = [e^0 e^0 e^\pi e^\pi]^T \quad (6)$$

$$W_{TXbeam1} = [e^0 e^{90} e^\pi e^0]^T \quad (7)$$

$$W_{TXbeam2} = [2e^0 0 2e^\pi 0]^T \quad (8)$$

$$W_{TXbeam3} = [0 2e^0 0 2e^\pi]^T \quad (9)$$

where $[*]^T$ represents a transpose, the weighting constant $e^0$ represents a complex number "1+j0"=1, the weighting constant $e^\pi$ represents a complex number "−1+j0"=−1, the weighting constant $2e^0$ represents a complex number "2+j0"=2, and the weighting constant $2e^\pi$ represents a complex number "−2+j0"=−2.

Here, in the transmission beam generating section 26, the multiplying section 261a receives the spread data of the plurality of users passing through the multiplexing output from the beam-by-beam multiplexing section 22 in correspondence with transmitting antenna 31a, assigns the weight by multiplying the weighting constant $e^0$, and outputs the weighted spread data of the plurality of users passing through the multiplexing in correspondence with the transmitting antenna 31a.

Likewise, the multiplying section 261b receives the spread data of the plurality of users passing through the multiplexing output from the beam-by-beam multiplexing section 22 in correspondence with transmitting antenna 31b, assigns the weight by multiplying the weighting constant $e^0$, and outputs the weighted spread data of the plurality of users passing through the multiplexing in correspondence with the transmitting antenna 31b.

Likewise, the multiplying section 261c receives the spread data of the plurality of users passing through the multiplexing output from the beam-by-beam multiplexing section 22 in correspondence with transmitting antenna 31c, assigns the weight by multiplying the weighting constant $e^\pi$, and outputs the weighted spread data of the plurality of users passing through the multiplexing in correspondence with the transmitting antenna 31c.

Likewise, the multiplying section 261d receives the spread data of the plurality of users passing through the multiplexing output from the beam-by-beam multiplexing section 22 in correspondence with transmitting antenna 31d, assigns the weight by multiplying the weighting constant $e^\pi$, and outputs the weighted spread data of the plurality of users passing through the multiplexing in correspondence with the transmitting antenna 31d.

In addition, in the transmission beam generating section 27, the multiplying section 271a receives the spread data of the plurality of users passing through the multiplexing output from the beam-by-beam multiplexing section 23 in correspondence with transmitting antenna 31a, assigns the weight by multiplying the weighting constant $e^0$, and outputs the weighted spread data of the plurality of users passing through the multiplexing in correspondence with the transmitting antenna 31a.

Likewise, the multiplying section 271b receives the spread data of the plurality of users passing through the multiplexing output from the beam-by-beam multiplexing section 23 in correspondence with transmitting antenna 31b, assigns the weight by multiplying the weighting constant $e^\pi$, and outputs the weighted spread data of the plurality of users passing through the multiplexing in correspondence with the transmitting antenna 31b.

Likewise, the multiplying section 271c receives the spread data of the plurality of users passing through the multiplexing output from the beam-by-beam multiplexing section 23 in correspondence with transmitting antenna 31c, assigns the weight by multiplying the weighting constant $e^\pi$, and outputs the weighted spread data of the plurality of users passing through the multiplexing in correspondence with the transmitting antenna 31c.

Likewise, the multiplying section 271d receives the spread data of the plurality of users passing through the multiplexing output from the beam-by-beam multiplexing section 23 in correspondence with transmitting antenna 31d, assigns the weight by multiplying the weighting constant $e^0$, and outputs the weighted spread data of the plurality of users passing through the multiplexing in correspondence with the transmitting antenna 31d.

Furthermore, in the transmission beam generating section 28, the multiplying section 281a receives the spread data of the plurality of users passing through the multiplexing output from the beam-by-beam multiplexing section 24 in correspondence with transmitting antenna 31a, assigns the weight by multiplying the weighting constant $2e^0$, and outputs the weighted spread data of the plurality of users passing through the multiplexing in correspondence with the transmitting antenna 31a.

Likewise, the multiplying section 281c receives the spread data of the plurality of users passing through the multiplexing output from the beam-by-beam multiplexing section 24 in correspondence with transmitting antenna 31c, assigns the weight by multiplying the weighting constant $2e^{\pi}$, and outputs the weighted spread data of the plurality of users passing through the multiplexing in correspondence with the transmitting antenna 31c.

Moreover, in the transmission beam generating section 29, the multiplying section 291b receives the spread data of the plurality of users passing through the multiplexing output from the beam-by-beam multiplexing section 25 in correspondence with transmitting antenna 31b, assigns the weight by multiplying the weighting constant $2e^0$, and outputs the weighted spread data of the plurality of users passing through the multiplexing in correspondence with the transmitting antenna 31b.

Likewise, the multiplying section 291d receives the spread data of the plurality of users passing through the multiplexing output from the beam-by-beam multiplexing section 25 in correspondence with transmitting antenna 31d, assigns the weight by multiplying the weighting constant $2e^{\pi}$, and outputs the weighted spread data of the plurality of users passing through the multiplexing in correspondence with the transmitting antenna 31d.

These multiplications can be easily implemented by code converters and adders.

The transmission multiplexing section 30 receives the weighted spread data of the plurality of users passing through the multiplexing output from the transmission beam generating sections 26, 27, 28 and 29 in correspondence with the individual transmitting antennas 31a, 31b, 31c and 31d, multiplexes them for each of the transmitting antennas 31a, 31b, 31c and 31d, and supplies to the individual transmitting antennas 31a, 31b, 31c and 31d.

In the transmission multiplexing section 30, the antenna-by-antenna multiplexing section 301a receives the weighted spread data of the plurality of users passing through the multiplexing output from the transmission beam generating sections 26, 27 and 28 in correspondence with the transmitting antenna 31a, multiplexes them for the transmitting antenna 31a, and supplies to the transmitting antenna 31a.

Likewise, the antenna-by-antenna multiplexing section 301b receives the weighted spread data of the plurality of users passing through the multiplexing output from the transmission beam generating sections 26, 27 and 29 in correspondence with the transmitting antenna 31b, multiplexes them for the transmitting antenna 31b, and supplies to the transmitting antenna 31b.

Likewise, the antenna-by-antenna multiplexing section 301c receives the weighted spread data of the plurality of users passing through the multiplexing output from the transmission beam generating sections 26, 27 and 28 in correspondence with the transmitting antenna 31c, multiplexes them for the transmitting antenna 31c, and supplies to the transmitting antenna 31c.

Likewise, the antenna-by-antenna multiplexing section 301d receives the weighted spread data of the plurality of users passing through the multiplexing output from the transmission beam generating sections 26, 27 and 29 in correspondence with the transmitting antenna 31d, multiplexes them for the transmitting antenna 31d, and supplies to the transmitting antenna 31d.

As described above, according to the present embodiment 1, the received beam generating section 12 generates the two received beams beam0 and beam1 which are perpendicular to each other and spatially separated by using the weights $W_{RXbeam0}$ and $W_{RXbeam1}$ using Fourier transform for the four received signals fed from the individual receiving antennas 11a, 11b, 11c and 11d. This makes it possible for the single demodulating section 16 to carry out the demodulation processing for the four receiving antennas 11a, 11b, 11c and 11d, thereby offering an advantage of being able to reduce the size of the apparatus as compared with the conventional radio communication apparatus that requires the demodulating sections of the same number as the receiving antennas.

In addition, the present embodiment 1 can detect the path information from the two received beams beam0 and beam1 generated, reduce the number of the path search sections, and reduce the number of the inputs to the demodulating section 16 to two. Accordingly, the present embodiment 1 can reduce the input switching function in the demodulating section 16, thereby offering an advantage of being able to miniaturize the apparatus.

Furthermore, the present embodiment 1 generates the two received beams beam0 and beam1, and supplies the demodulating section 16 with the received signal having the antenna gain four times greater than that of a single receiving antenna, thereby offering an advantage of being able to improve the receiving performance.

Moreover, according to the present embodiment 1, the receiving apparatus detects the path information from the received beams beam0 and beam1, and selects the transmission beam including the arrival direction of the incoming waves; and the transmitting apparatus radiates the transmission beam selected. This offers an advantage of being able to reduce the transmitting power.

Although the present embodiment 1 employs the four receiving antennas 11a, 11b, 11c and 11d, this is not essential. For example, a diversity configuration is also possible by adding four other receiving antennas, in which case the signals fed from the eight antennas can be converted into four received beams. In addition, providing receiving antennas in such a manner as to compensate for the reductions between the received beams offers an advantage of being able to improve the receiving characteristics.

In addition, although the present embodiment 1 multiplexes the spread data of the plurality of users into the transmission beams beam0, beam1, beam2 and beam3, and transmits them from the four transmitting antennas 31a, 31b, 31c and 31d, this is not essential. For example, they can be transmitted using a single nondirectional transmitting antenna without carrying out the beam combining.

INDUSTRIAL APPLICABILITY

As described above, the radio communication apparatus in accordance with the present invention is suitable for miniaturizing the apparatus by reducing the number of the demodulating sections in comparison with the number of the receiving antennas.

What is claimed is:

1. A radio communication apparatus that has first, second, third and fourth receiving antennas for receiving incoming radio waves, and carries out communication with mobile communication terminals, said radio communication apparatus comprising:

a received beam generating section for generating first and second received beams which are perpendicular to each other and spatially separated by assigning weights to received signals fed from the first, second, third and fourth receiving antennas by using first and second received beam weights utilizing Fourier transform, said receiving beam generating section assigning weights to the received signals fed from the first, second, third and fourth receiving antennas using the first received beam weight of a fixed weight to generate a first received beam having a major lobe in a certain direction and a grating lobe in a direction 180 degrees opposite to the certain direction; and assigning weights to the received signals using the second received beam weight of a fixed weight to generate a second received beam which is orthogonal to the first received beam, and including a major lobe in a certain direction and a grating lobe in a direction 180 degrees opposite to the certain direction;

a first signal arriving timing detecting section for measuring a received signal level using the first received beam fed from said received beam generating section and a known reference signal set for each of the individual mobile communication terminals, and for outputting signal arriving timing information when the first received beam includes the reference signal;

a second signal arriving timing detecting section for measuring a received signal level using the second received beam fed from said received beam generating section and a known reference signal set for each of the individual mobile communication terminals, and for outputting signal arriving timing information when the second received beam includes the reference signal; and a demodulating section for receiving the first and second received beams from said received beam generating section, and for outputting demodulation data by performing maximal-ratio combining in response to the signal arriving timing information fed from said first and second signal arriving timing detecting sections.

2. The radio communication apparatus according to claim 1, further comprising:

a feedback control section for outputting selection information by selecting a transmission beam to be transmitted in response to the signal arriving timing information fed from said first and second signal arriving timing detecting sections and to the phase difference between the first and second received beams fed from said demodulating section;

a plurality of transmission signal processing sections for receiving user data to be transmitted to the individual mobile communication terminals, and for outputting transmission data of users by carrying out transmission signal processing in response to transmission processing information for identifying a user, which transmission processing information is set for each of the individual mobile communication terminals;

a beam-by-beam multiplexing section for receiving the transmission data of a plurality of users fed from said plurality of transmission signal processing sections, and for multiplexing the transmission data of the plurality of users on a transmission beam-by-transmission beam basis in response to the selection information fed from said feedback control section;

a transmission beam generating section for receiving the transmission data of the plurality of users passing through the multiplexing from said beam-by-beam multiplexing section, and for outputting weighted transmission data of the plurality of users passing through the multiplexing by assigning weights using transmission beam weights; and a transmission multiplexing section for receiving the weighted transmission data of the plurality of users passing through the multiplexing fed from said transmission beam generating section, and for multiplexing the weighted transmission data on an antenna-by-antenna basis of the first, second, third and fourth receiving antennas.

3. The radio communication apparatus according to claim 2, wherein said feedback control section:

outputs, when a received signal is found in the first received beam in response to the signal arriving timing information fed from said first signal arriving timing detecting section, the selection information that enables a first transmission beam having directivity in a same direction as the first received beam;

outputs, when a received signal is found in the second received beam in response to the signal arriving timing information fed from said second signal arriving timing detecting section, the selection information that enables a second transmission beam having directivity in a same direction as the second received beam;

outputs, when a received signal is found in both the first and second received beams in response to the signal arriving timing information fed from said first and second signal arriving timing detecting sections, and if phases of the received signals with a same delay in the first and second received beams have opposite phases, the selection information that enables a third transmission beam having directivity in a direction of opposite intersection points of the first and second received beams; and outputs, when a received signal is found in both the first and second received beams in response to the signal arriving timing information fed from said first and second signal arriving timing detecting sections, and if phases of the received signals with a same delay in the first and second received beams have a same phase, the selection information that enables a fourth transmission beam having directivity in a direction of opposite intersection points of the first and second received beams and in a direction shifted by 90 degrees from the third transmission beam.

* * * * *

UNITED STATES PATENT AND TRADEMARK OFFICE
CERTIFICATE OF CORRECTION

PATENT NO. : 7,522,939 B2  Page 1 of 1
APPLICATION NO. : 10/581719
DATED : April 21, 2009
INVENTOR(S) : Toyohisa Tanaka It is certified that error appears in the above-identified patent and that said Letters Patent is hereby corrected as shown below:

Title page, item (57), line 3, change "perpendicular" to --orthogonal--.

Column 3, line 16, change "perpendicular" to --orthogonal--.

Column 6, line 26, change "perpendicular" to --orthogonal--.

Column 13, line 62, change "perpendicular" to --orthogonal--.

Column 14, line 58, change "perpendicular" to --orthogonal--.

Column 14, line 63, change "receiving" to --received--.

Signed and Sealed this

Eighteenth Day of August, 2009

David J. Kappos
*Director of the United States Patent and Trademark Office*